(12) United States Patent
Ohlsson et al.

(10) Patent No.: US 6,452,950 B1
(45) Date of Patent: Sep. 17, 2002

(54) ADAPTIVE JITTER BUFFERING

(75) Inventors: Mattias Ohlsson; Jörgen Nygren; Stellan Lundqvist, all of Umeå(SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 09/231,886

(22) Filed: Jan. 14, 1999

(51) Int. Cl.⁷ .................................................. H04J 3/06
(52) U.S. Cl. ...................................... 370/516; 370/519
(58) Field of Search ................................ 711/167, 170; 714/761, 762, 763; 370/503, 507, 509, 516, 517, 519

(56) References Cited

U.S. PATENT DOCUMENTS

| | | | |
|---|---|---|---|
| 4,942,547 A | * 7/1990 | Joyce et al. | 708/510 |
| 4,958,341 A | * 9/1990 | Hemmady et al. | 370/352 |
| 4,977,582 A | * 12/1990 | Nichols et al. | 370/517 |
| 5,566,208 A | * 10/1996 | Balakrishnan | 370/468 |
| 5,604,793 A | 2/1997 | Prabhakar et al. | |
| 6,259,677 B1 | * 7/2001 | Jain | 370/252 |
| 6,360,271 B1 | * 3/2002 | Schuster et al. | 370/516 |

FOREIGN PATENT DOCUMENTS

| WO | WO95/22233 | 8/1995 |
|---|---|---|
| WO | WO96/15598 | 5/1996 |

OTHER PUBLICATIONS

"RTP: A Transport Protocol for Real–Time Applications", pp. 1–56, Jan. 1996.

Ramjee, Ramachandran et al., "Adaptive Playout Mechanisms for Packetized Audio Applications in Wide–Area Networks", Proceeding of the conference on Computer Communications (Inforcom), Toronto, pp. 680–688, Jun. 12–16, 1994.

Mouly, Michel et al., "GSM —The System for Mobile Communications", GSM System for Mobile Communications, Comprehensive Overview of the European Digital Cellular Systems, pp. 161–166, 1992.

* cited by examiner

*Primary Examiner*—David Vincent
(74) *Attorney, Agent, or Firm*—Burns, Doane, Swecker & Mathis, L.L.P.

(57) ABSTRACT

In a packet communication system, the delay time needed in a jitter buffer is determined, enabling a smooth data feed to an application without excessive delays, by methods and apparatus that vary the size of the jitter buffer based on an estimated variation of packet transmission delay derived from the times of arrival of stored packets. A variance buffer stores variances of the times of arrival of stored packets, and the estimated variation of packet transmission delay is derived from the stored variances. The size of the jitter buffer can be changed preferentially during periods of discontinuous packet transmission.

15 Claims, 6 Drawing Sheets

FIG. 6A
FIG. 6B
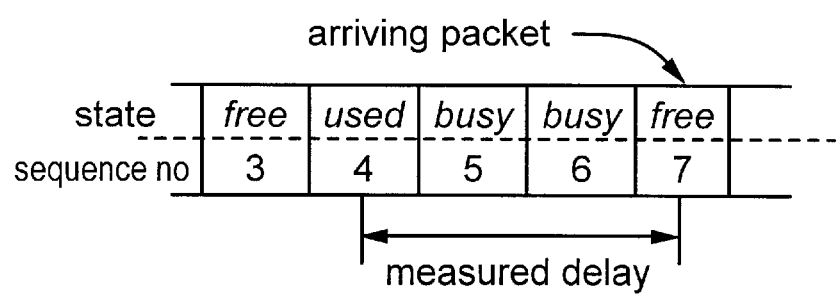
FIG. 7A
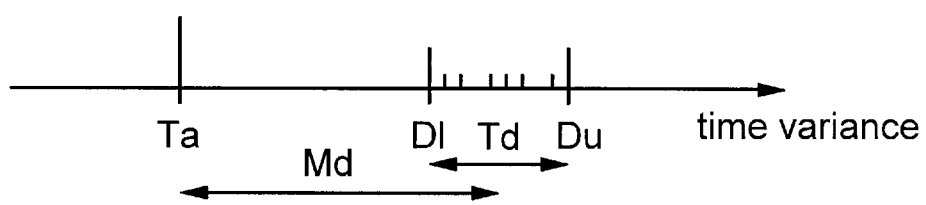
FIG. 7B buffer 10

| D | X | X | X | X | S | S | S | S | S | S | D | X | X | X |

FIG. 8A buffer 10

| D | X | X | X | X | S | S | S | S | S | S | X | D | X | X | X |

FIG. 8B

ADAPTIVE JITTER BUFFERING

BACKGROUND

This invention relates to electrical telecommunication and more particularly to packet networks using the Internet Protocol and even more particularly to minimizing delays in packet delivery in such networks.

Applications sending real-time data streams over unreliable Internet Protocol (IP) networks have a lot of problems to overcome, including long and variable delays and lost and out-of-sequence packets. Today, these problems can be reduced by using techniques such as the Real Time Protocol (RTP) and jitter buffers.

The RTP is a real-time transport protocol that provides end-to-end network transport functions suitable for applications transmitting real-time data, such as audio, video, or simulation data, over multicast or unicast network services. The RTP does not address resource reservation and does not guarantee quality-of-service for real-time services. The RTP provides for sequence numbering, which tells the receiving node if the packets are arriving in sequence or at all. The data transport is augmented by a control protocol (RTCP) to allow monitoring of the data delivery in a manner scalable to large multicast networks, and to provide minimal control and identification functionality. The RTP and RTCP are designed to be independent of the underlying transport and network layers. The RTP is specified in H. Schulzrinne et al., Request for Comments 1889 "RTP: A Transport Protocol for Real-Time Applications", (Feb. 1, 1996).

Jitter buffers are memories in receiving nodes that are used for sorting the packets into the correct sequence, and delaying the packets as needed to compensate for variations in network delay. The RTP specification discusses such interarrival jitter in Section 6.3.1 and Appendix A.8 that provide for forming a 32-bit estimate of the statistical variance of the RTP data packet interarrival time, measured in timestamp units and expressed as an unsigned integer. The interarrival jitter J is defined to be the mean deviation (smoothed absolute value) of the difference D in packet spacing at the receiver compared to the sender for a pair of packets. As shown in the equation below, this is equivalent to the difference in the "relative transit time" for the two packets; the relative transit time is the difference between a packet's RTP timestamp and the receiver's clock at the time of arrival, measured in the same units. If Si is the RTP timestamp from packet i, and Ri is the time of arrival in RTP timestamp units for packet i, then for two packets i and j, D may be expressed as:

$$D(i,j)=(Rj-Ri)-(Sj-Si)=(Rj-Sj)-(Ri-Si)$$

The interarrival jitter is calculated continuously as each data packet i is received from the source, using this difference D for that packet and the previous packet i−1 in order of arrival (not necessarily in sequence), according to the formula:

$$J=J+(|D(i-1, i)|-J)/16$$

This algorithm is the optimal first-order estimator and the gain parameter 1/16 gives a good noise reduction ratio while maintaining a reasonable rate of convergence.

The problem today is determining the delay time needed in the jitter buffer to achieve a smooth data feed to the application, without excessive delays. This problem can seriously affect voice communication using the Internet/intranet as the backbone for transmitting the speech. In addition, the need for smarter use of network bandwidth will become more and more important as the number of users of IP telephony increases.

In the communications between a mobile cellular telephone and a radio base station, it is common to employ a technique called discontinuous transmission (DTX) mainly to save battery power in the mobile. Briefly stated, DTX means that a transmitter does not send any data if it does not have any new data to send. When a mobile station detects that the user is not speaking, the mobile station sends only Silence Descriptor (SID) frames that contain background noise. The SID frames are sent periodically, generally about every 480 milliseconds, and between the SID frames the mobile station sends nothing.

The idea of using DTX to save bandwidth has been brought up in the IMTC Voice over IP Forum Technical Committee (V61P1A 1.0), but no implementations have yet been discussed. There are also some special cases that need to be handled when using DTX over an IP network.

SUMMARY

Applicants' invention solves the problem of determining the delay time needed in a jitter buffer and achieves the object of obtaining a smooth data feed to an application, without excessive delays. Thus, Applicants' invention improves voice communication using the Internet/Intranet as the backbone for transmitting the speech and uses network bandwidth more intelligently.

In one aspect of the invention, there is provided a receiving node in a packet communication system that includes a jitter buffer that has a variable size, that stores packets arriving at the receiving node, and that releases stored packets to an application executing in the receiving node, wherein each packet has a respective sequence number, stored packets are released periodically, and each entry in the jitter buffer has one of a plurality of states; and a processor that varies the size of the jitter buffer based on an estimated variation of packet transmission delay derived from the times of arrival of stored packets.

The receiving node may further include a variance buffer that stores variances of the times of arrival of stored packets, and the time that the first-arrived packet is released is based on the time of arrival of the first packet and the initial delay, and the estimated variation of packet transmission delay is derived from the stored variances.

The states of the jitter buffer entries may be free, busy, and used, the free state indicating that no arrived packet is stored at that location in the jitter buffer, the busy state indicating that an arrived packet is stored at that location in the jitter buffer, and the used state indicating that an arrived packet stored at that location is being released to the application. Arrived packets may then be stored in respective locations that are marked in the busy state; packets may be released in response to queries by the application; and when the application queries the jitter buffer for a next packet, that packet's respective location may be changed to the used state and the respective location of the previously arrived packet may be changed to the free state.

The processor may decrease the size of the jitter buffer while the receiving node is in a discontinuous transmission mode, thereby avoiding discarding arrived packets that hold speech information. The receiving node may then include a DTX buffer that stores selected packets arriving at the receiving node. An arriving packet is selected based on at least one of whether the arriving packet is first to arrive after a speech period and holds total noise information and whether the arriving packet contains noise-update information, arrives after a speech period, and has a respective sequence number that is subsequent to the sequence number of an earlier arriving packet holding speech information. The processor then changes the size of the jitter buffer while packets are being selected, thereby avoiding discarding packets holding speech information.

In another aspect of the invention, there is provided a method of storing in a buffer packets arriving at a receiving node in a packet communication system and releasing arrived packets to an application executing in the receiving node. The method includes the steps of determining a time Tr to release a first arrived packet to the application, the time Tr being the first packet's arrival time Ta plus an initial delay, while waiting for the first arrived packet to be released from the buffer, comparing a current time to the time Tr and releasing the first arrived packet when the time Tr has passed, and after the first arrived packet is released, releasing stored packets periodically at first intervals.

The comparing may be performed in response to queries from the application that occur periodically at second intervals, stored packets arrived after the first arrived packet may be released in response to queries from the application that occur periodically at the first intervals, and the first interval may be at least as long as the second interval. Also, the first interval may be substantially equal to transmission intervals between arriving packets.

In a further aspect of the invention, there is provided a method of adapting a size of a buffer that stores packets arriving at a receiving node in a packet communication system. The method includes the steps of: counting a number of arrived packets having sequence numbers lower than that of an oldest arrived packet stored in the buffer; comparing the number to an accepted loss parameter; if the number is greater than the accepted loss parameter, increasing a change indicator counter and if the number is equal to or less than the accepted loss parameter, decreasing the change indicator counter; increasing the size of the buffer when the change indicator counter reaches an indicator roof parameter if the buffer is not already at its largest permitted size; and decreasing the size of the buffer when the change indicator counter reaches an indicator floor parameter if the buffer is not already at its smallest permitted size.

The step of determining the size of the buffer may be performed by determining an expected arrival time of a packet in relation to an arrival time of a first packet of a packet sequence; determining an arrival time variance for the packet; determining a measured delay that is a time the packet will be delayed in the buffer; determining a desired delay based on the arrival time variance and the accepted loss parameter; and determining the size of the buffer based on the desired delay and the measured delay.

The arrival time variances may be stored in a variance buffer and sorted and normalized. Also, measured delays may be accumulated for packets having arrival time variances stored in the variance buffer, and the desired delay may be determined based on the sorted, normalized arrival time variances and the accepted loss parameter. The size of the buffer is then determined based on the desired delay and an average measured delay derived from the accumulated measured delays.

The size of the buffer may be decreased while the receiving node is in a discontinuous transmission mode, thereby avoiding discarding arrived packets that hold speech information. The method may then include the step of storing in a DTX buffer selected packets arriving at the receiving node. An arriving packet is selected based on at least one of whether the arriving packet is first to arrive after a speech period and holds total noise information and whether the arriving packet contains noise-update information, arrives after a speech period, and has a respective sequence number that is subsequent to the sequence number of an earlier arriving packet holding speech information. The size of the buffer is then changed while packets are being selected, thereby avoiding discarding packets holding speech information.

BRIEF DESCRIPTION OF THE DRAWINGS

The invention and its objects and advantages will be understood by reading this description in conjunction with the drawings, in which:

FIGS. 6A, 6B illustrate a buffer for storing packet arrival time variances;

FIG. 7A illustrates measured delays for packets in the jitter buffer;

FIG. 7B illustrates a principle behind the buffer size change determination; and FIGS. 8A, 8B illustrate operation of a jitter buffer with discontinuous packet transmission.

DETAILED DESCRIPTION

Applicants' invention solves the problem of determining the delay time needed in a jitter buffer to achieve a smooth data feed to an application, without excessive delays. Applicants' solution needs only an initial delay value to be provided, after which it adapts itself to a suitable delay by measuring arrival time variations and a number of packets arriving too late. Applicant's solution is based on an assumption that the transmitter sends the data packets at intervals that are known to the receiver, e.g., regular intervals.

In accordance with Applicants' invention, an adaptive jitter buffer stores data packets arriving at a node over the IP network and handles data packets that arrive late or out of sequence. The transmitter sends the data packets over the network using a protocol such as the RTP that provides for a respective sequence number in each packet, which tells the receiving buffer in what sequence the arriving packets should be entered into the buffer.

Figure 1:
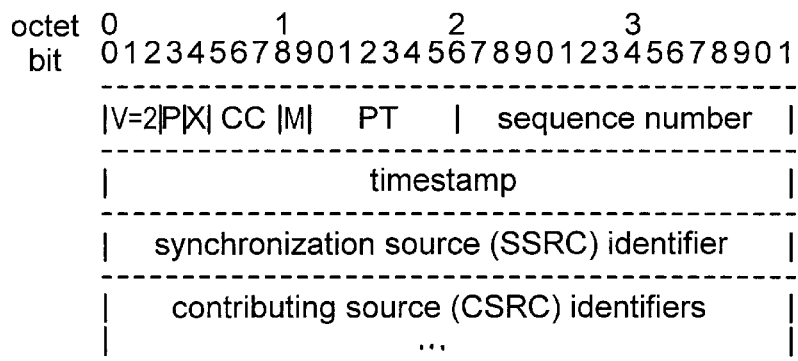
FIG. 1 illustrates a packet header format.

As an example of a useful protocol, the header format of RTP packets is illustrated by FIG. 1, which indicates bit positions and octet numbers across the top. Each header comprises at least twelve of octets organized into the following fixed header fields:

version (V): 2 bits
padding (P): 1 bit
extension (X): 1 bit
contributing source (CSRC) count (CC): 4 bits
marker(M): 1 bit
payload type (PT): 7 bits
sequence number: 16 bits
timestamp: 32 bits synchronization source (SSRC): 32 bits CSRC list: 0 to 15 items, 32 bits each The first twelve octets are present in every RTP packet, while the list of CSRC identifiers is present only when inserted by a RTP mixer. The details of the fixed header fields are described in Section 5.1 of the RTP specification. It is sufficient to note here that the PT field identifies the format of the RTP payload and determines its interpretation by the application that is to use the payload. A profile specifies a default static mapping of payload type codes to payload formats. Additional payload type codes may be defined dynamically. An RTP sender emits a single RTP payload type at any given time.

The sequence number increments by one for each RTP data packet sent, and may be used by the receiver to detect packet loss and to restore packet sequence. The initial value of the sequence number is random (unpredictable) to make known-plaintext attacks on encryption more difficult, even if the source itself does not encrypt, because the packets may flow through a translator that does. It will be appreciated, therefore, that it is not necessary for the transmitter to use the RTP but only to provide suitable sequence numbers in the packets.

Figure 2A:
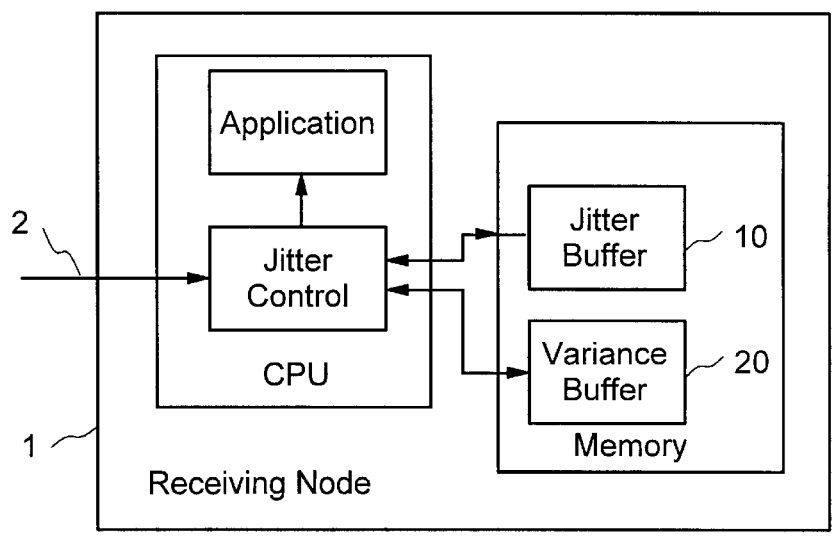
FIGS. 2A, 2B illustrate a receiving node having a jitter buffer.

In accordance with Applicants' invention, the receiving node determines times to release arrived packets from an adaptive jitter buffer to an application. The arrangement of a receiving node 1 is depicted highly schematically in FIG. 2A and the arrangement of the jitter buffer 10 in the receiving node 1 is depicted in more detail in FIG. 2B. The node 1 receives a stream or sequence 2 of arriving packets that are provided to a processor CPU in the receiving node. As illustrated in FIG. 2A, the processor executes the instructions that make up the application to which the packets are directed as well as the instructions that make up the methods of controlling the jitter buffer 10 and, if provided, a variance buffer 20 that are described in more detail below. The buffers 10, 20 reside in a memory provided in the receiving node 1.

Figure 2B:
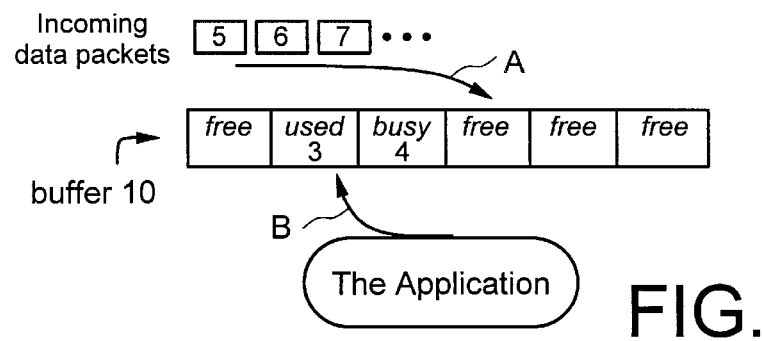

FIG. 2B shows a sequence of incoming data packets 5, 6, 7, ... that are stored in respective locations in the jitter buffer 10 as indicated by the arrow A. Already arrived packets are released from the buffer 10 to the application as indicated by the arrow B. FIG. 2B depicts a situation in which already arrived packets 3, 4 have already been stored in locations in the buffer 10. The locations in the buffer 10 are identified as either free, used, or busy for reasons that are explained below.

Figure 3:
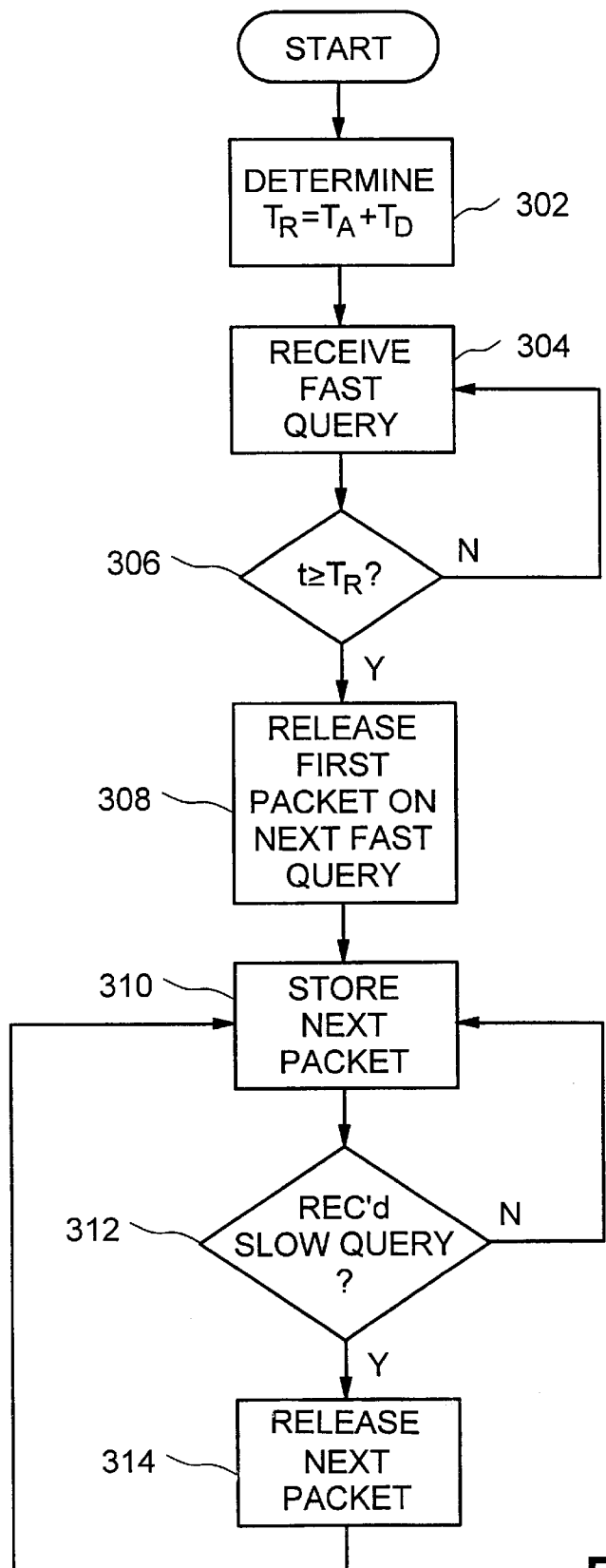
FIG. 3 illustrates a method of storing and releasing packets in the jitter buffer.

FIG. 3 illustrates the process of storing incoming packets and releasing arrived packets to an application. One important aspect of this method is the calculation of a time Tr to release the first arrived packet to the application (step 302). In essence, this time is the first packet's arrival time Ta plus a specified initial delay that is an initial estimate of a desired delay Td, which is determined as described below.

While the application waits for data to be released from the jitter buffer 10, the application may query the buffer periodically, at short intervals (step 304). As long as the application is not given a data packet by the jitter buffer, the application does not do anything. Each time the application queries the buffer for the first data packet, the buffer compares the current time t to the release time Tr of the first packet (step 306). It will be appreciated that further packets, i.e., packets arriving after the first arrived packet, can arrive during steps 304, 306 before the first packet has been released. After the release time has passed, the buffer gives the first data packet to the application the next time the application sends a short-interval or "fast" query to the jitter buffer 10 (step 308), or perhaps more precisely the processor in the receiving node that controls the jitter buffer 10.

After the first packet is given to the application, it is preferable that no more time comparisons are done when releasing packets. Incoming packets are stored in the jitter buffer (step 310) as described below, and packets are given to the application whenever it queries for them (steps 312, 314). These queries for more data can arrive at the jitter buffer 10 with intervals between them that are substantially the same as or longer than the intervals between the "fast" queries (i.e., these queries are "slow" compared to the queries for the first arrived packet). The time intervals between the slow queries need not be less than substantially the transmit intervals between the packets, which as noted above are known to the receiver. In a simple communication system, the packets are transmitted at regular intervals, i.e., the transmit intervals are substantially equal to each other. In fact, the time intervals between the slow queries are preferably substantially the same as the packet transmission intervals.

It will be appreciated that the fast and slow queries need not arise from the application, but more generally can be any signals, e.g., from a timer or timers, that can cause the first arrived packet and/or subsequently arrived packets to be released to the application.

Referring again to FIG. 2B, each jitter buffer entry can be in one of three different states: free, busy, or used. The free state means that no arrived packet is stored at that location in the buffer; the busy state means that an arrived packet is stored at that location; and the used state means that the arrived packet stored at that location is being released to or accessed by the application. Packets are released from the jitter buffer 10 in accordance with the value of a read pointer that indicates which buffer location to access as each query is received from the application. It will be understood that the read pointer is in essence nothing more than a recirculating counter, with each count value corresponding to a respective location in the jitter buffer.

As packets are released from the jitter buffer to the application, the states of the entries change in the following way. The first packet actually arrived is stored in a location that is marked in the busy state, and the read pointer is initialized to that location. After the first arrived packet has been released to the application as described above, that location is changed to the used state. It is generally advantageous for the packet currently being accessed by the application (i.e., the buffer entry in the used state) to be treated as the first packet in the buffer 10. When it is time for the application to get the next packet, the entry currently in the used state is changed to the free state and the next entry in the buffer (as indicated by the read pointer) is transformed from the busy state to the used state. If the next entry in the buffer is in the free state, no packet is given to the application (since there is not an arrived packet stored at that location), and the read pointer indicating which buffer location to read the next time the application queries the buffer for a packet is advanced. If the sequence number of an incoming packet is lower than the sequence number of a used-state packet, the incoming packet is regarded as arriving too late and is discarded.

Four parameters may be used advantageously for configuring Applicants' method of adapting the behavior of the jitter buffer to changing communication conditions. A Sampling Interval is a number of data packets to measure over before a buffer size change calculation is performed. An Acceptable Loss is a number of data packets the loss of which due to delay can be accepted during one Sampling Interval before changing the size of the buffer. Indicator Roof and Indicator Floor parameters are used for controlling the sensitivity of the method. These and other parameters employed in Applicants' methods can generally be changed as desired at any time.

Figure 4:
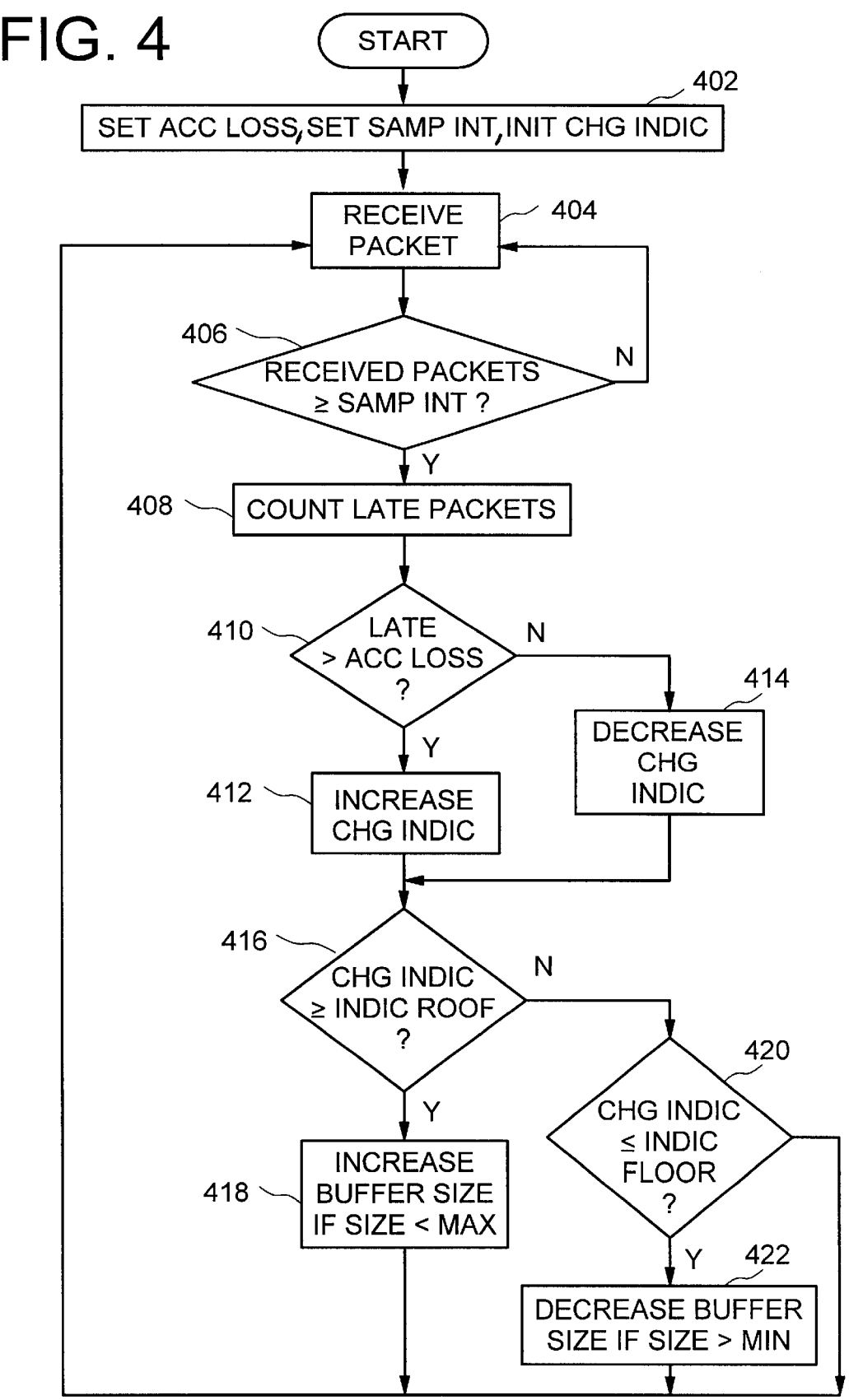
FIG. 4 illustrates a method of determining when to change the size of a jitter buffer.

These parameters and a Change Indicator counter are used in Applicants' method of determining when to change the buffer size that is illustrated by the flow chart of FIG. 4, which begins with setting the parameters and initializing the Change Indicator counter to zero (step 402). This method can be executed from time to time at the prompting of the application receiving the packets, but it is currently believed to be preferable for the method to run continuously as packets are received.

The jitter buffer 10 stores incoming packets in respective memory locations (step 404), and checks whether the buffer has received the number of packets specified by the Sampling Interval parameter (step 406). When the number of received packets is greater than the Sampling Interval parameter, the number of packets arriving too late, i.e., the number of arriving packets having sequence numbers lower than that of the packet being accessed by the application (i.e., the buffer entry in the used state), is read from a Lost Packets counter (step 408). The "Lost Packets" count includes only packets that are delayed, not packets that are lost. The Lost Packets counter is updated as each packet is received after being initialized to zero at the start of a sampling interval corresponding to the Sampling Interval parameter.

The Lost Packets count for the sampling interval is compared to the Accepted Loss parameter (step 410). If the Lost Packets count is greater than the Accepted Loss parameter, the Change Indicator counter is increased by one (step 412). If the Lost Packets count is equal to or less than the Accepted Loss parameter, the Change Indicator counter is decreased by one (step 414). It can be advantageous in some circumstances for the Change Indicator counter not to be decreased when the Lost Packets count is equal to the Accepted Loss parameter. Such circumstances include for example when the application requires more caution for decreasing the jitter buffer size. Packets are discarded when the size of the jitter buffer is decreased, so more caution is usually appropriate to avoid excessively discarding packets when there are rapid up/down changes in the network transmission delay. If this is done, the Accepted Loss parameter used in the method depicted in FIG. 4 must not be zero.

When the Change Indicator counter reaches the Indicator Roof parameter (step 416), it is time to increase the size of the jitter buffer 10, provided the buffer is not already at its largest permitted size (step 418). When the Change Indicator counter reaches the Indicator Floor parameter (step 420), it is time to decrease the size of the buffer (step 422), provided the buffer is not already at its smallest permitted size. It is currently believed that the largest buffer size, which corresponds to the longest delay in the jitter buffer, is dependent on the application. In addition, it can be noted that the longest delay in the jitter buffer is the same as the longest desired delay Td if the Accepted Loss parameter is zero. For example, two-way voice or video communication could find a one-second delay unacceptable but such a delay and even longer delays could be acceptable for data file transfers and one-way video communication. It is currently believed that the smallest buffer size would typically be one packet, i.e., the shortest delay Td would typically be the packet transmission interval. It is conceivable that the smallest buffer size could be zero packets, i.e., packets could be released immediately upon arrival (Td≈0), but that would require a communication network having little if any variance in transmission delay.

Figure 5:
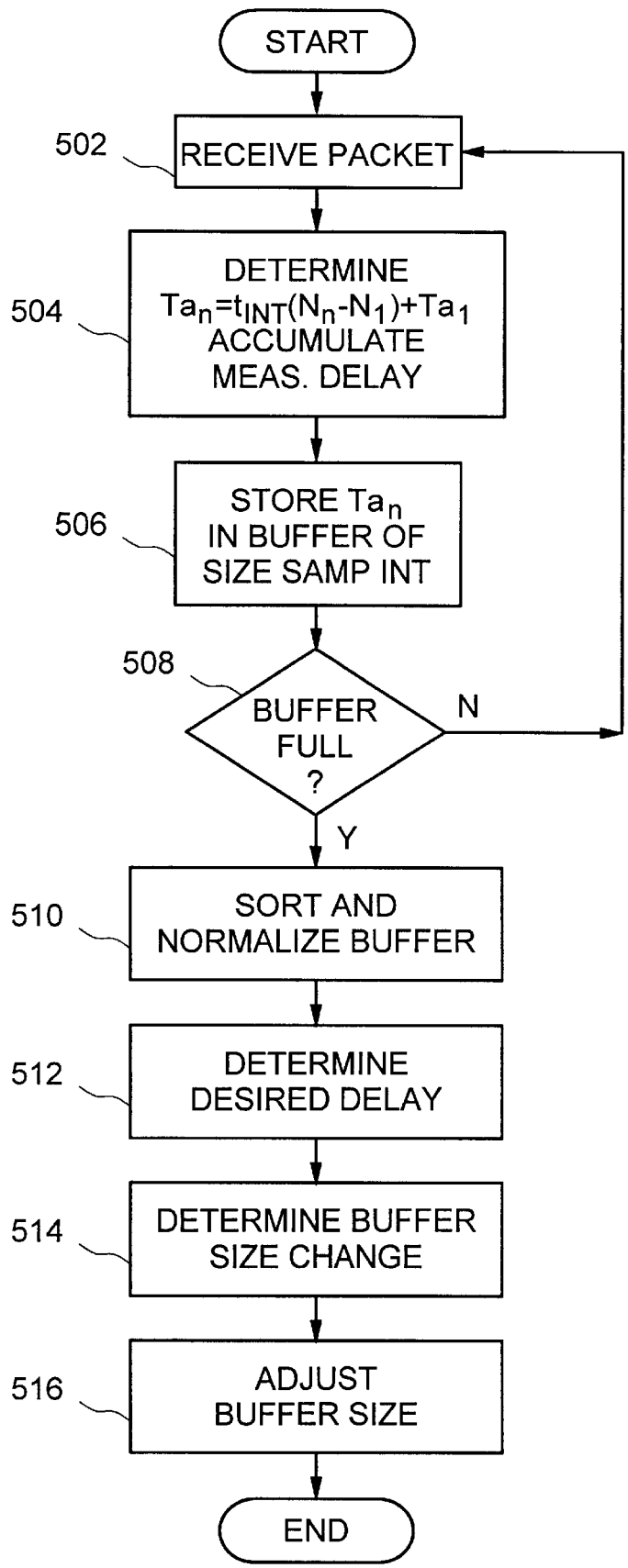
FIG. 5 illustrates a method of determining a size change of a jitter buffer.

Once it is determined that the size of the jitter buffer 10 should be changed by the method depicted in FIG. 4, the new size of the buffer (step 418 or step 422) can be determined by the method illustrated by FIG. 5, which begins as the method depicted in FIG. 4 with the jitter buffer 10 storing incoming packets in respective memory locations (step 502). Here, it is not necessary to check whether the buffer has received the number of packets specified by the Sampling Interval parameter, although this could be done if desired.

During the sampling interval, the arrival time of each packet is compared to the arrival time of the first packet of this packet sequence. By adding the product of the packet transmission interval and the difference between the sequence numbers of successive packets to the arrival time of the first packet, the expected arrival time of a particular packet in relation to the arrival time of the first packet can be determined (step 504). This expected arrival time $Ta_n$ of the packet having sequence number n is given by the following expression:

$$Ta_n = ti \cdot (N_n - N_1) + Ta_1$$

where $Ta_1$ is the arrival time of the first packet, ti is the packet transmission interval, $N_n$ is the sequence number of the currently arriving packet, and $N_1$ is the sequence number of the first packet. Instead of using the arrival time of the first packet in the sequence, the method can use the arrival time of the first packet in the current sampling interval. Also as part of step 504, measured delays are accumulated as explained in more detail below.

An arrival time variance v for packet n is determined according to the following expression when the packet n arrives:

$$v = Tactual_n - Ta_n$$

where $Tactual_n$ is the actual arrival time the packet arrives. In accordance with one aspect of the invention, this variance may be stored in the variance buffer 20 (step 506). The buffer 20 for storing the variances is preferably separate from the jitter buffer 10 and has a size corresponding to the same length of the sampling interval, so that variances are stored one by one until the buffer 20 is full (step 508). As depicted by FIG. 6A, the first entry in the buffer 20 represents the first packet of this sampling interval, and the last entry represents the last packet of this sampling interval. The variance entries in the buffer 20 are sorted and normalized (step 510) such that the smallest value is zero as depicted in FIG. 6B.

It will be appreciated that in general it is not necessary to use a variance buffer 20 and that the desired delay, i.e., the size of the jitter buffer, can be determined as each packet arrives from each packet's respective variance v. Thus, the processes of steps 506, 508, 510 may be considered, in a way, as operating on a single variance, i.e., that of one of the arrived packets.

Based on the contents of the buffer 20 or on an individual variance as just described, the desired delay Td can be determined (step 512). The example depicted in FIG. 6B shows that the variance in arrival times is seventeen time units. This means that if the Accepted Loss parameter is set to zero (meaning no packets can be lost), then the desired delay Td in the jitter buffer 10 during this sampling interval is seventeen time units. If the Accepted Loss parameter is set to one (meaning one packet can be lost), then the desired delay Td in the jitter buffer during this sampling interval is thirteen time units. The desired delay Td is given in general by the following expression:

$$Td = buffer(Sampling\ Interval - Accepted\ Loss)$$

if the buffer 20 uses a 1-based indexing mechanism in which the first entry in the buffer is indexed as one, the second entry is indexed as two, etc.

During the sampling interval an accumulated measured delay can be maintained as noted above in connection with step 504. The measured delay is the time the current arriving packet will be delayed in the buffer, as illustrated by FIG. 7A. The measured delays for the packets in the sampling interval can be accumulated as the packets arrive for deriving an average measured delay Md that is used as described below.

In accordance with Applicants' invention, the desired delay Td and the measured delay Md are used for determining the size of any necessary jitter buffer size change (step 514). FIG. 7B graphically describes how the current size of the jitter buffer 10 can be changed by (Td/2−Md) time units without causing arriving packets (Ta) to be considered late.

Packet arrival time variances are represented in FIG. 7B on the horizontal axis. Ta is the time variance in when the application requests new data packets. There will be no or negligible variance in Ta when the application requests packets at regular intervals. The lines Dl and Du represent the lower and upper limits of the range of variances in packet arrival time for packets in the sampling interval, and the short vertical lines between Dl and Du represent variances for individual packets. It will be seen that Du is the variance for the packet selected as the desired delay Td in the preceding expression. If the range Dl-Du includes all variances during a sampling interval, then Td is that for an Accepted Loss value of zero. Md is the average measured delay, that can be obtained by accumulating the measured delays for packets that actually arrived during this sampling interval, i.e., packets arrived both on time (in the range Dl-Du) and too late, and dividing by that number of packets.

The purpose of step 514 is to move Dl as close to Ta as possible, i.e., to minimize the measured delay in the jitter buffer without losing packets, according to the following expression:

$$Delay\ Modification = Td/2 - Md$$

The Delay Modification value tells the number of time units that the size of the jitter buffer should be increased or decreased. This value is rounded up to the closest value that is a multiple of the packet transmission interval, and is then divided by the transmission interval to find the number of packets more or fewer needed in the jitter buffer.

As indicated by step 516, the jitter buffer size is increased by denying the application newly arriving packets according to the number determined in step 514 and is decreased by discarding a number of packets according to the number determined in step 514. It will be understood that steps 510 through 516 correspond to steps 418 and 10 422. In this way, the size of the jitter buffer is adapted to the communication conditions existing during the sampling interval.

Applicants' method of adapting the jitter buffer size may be implemented advantageously in combination with DTX, which as explained above means that the transmitter does not send any packets when it does not have any new data to send. If this method is used, there will be periods of time when the jitter buffer does not receive any new data and it is therefore possible to decrease the buffer size without discarding packets.

Another advantage to DTX with an adaptive jitter buffer is provided if the packets arise from a speech application, such as voice over an IP network. The adaptive jitter buffer can change its size from time to time, and when the buffer size decreases, some speech frames will be discarded. This can disturb the speech vocoder, distorting the speech. Nevertheless, discarding or losing packets during periods of DTX, e.g., silence, avoids the disturbance. As noted above, when a user is not speaking, a transmitter periodically sends only SID frames that contain background noise. In general, using DTX with an adaptive jitter buffer for a speech application requires storing the SID frames in a separate location in the memory of the receiving node 1, not in the jitter buffer 10.

The following describes an implementation of DTX with an adaptive jitter buffer in a communication system in accordance with the Global System for Mobile communication (GSM) standard. Such communication systems are well known in the art so they need not be described in detail here. It will be appreciated that DTX may be employed when the packets hold information other than speech and noise information, which thus will be understood to mean more generally any first and second types of information used in the communication system employing DTX.

In DTX in a GSM system, the transmitter such as a mobile station generates two types of SID frames or packets and sends them to the radio base station (RBS), which may be a receiving node 1 as described above or which may simply forward the packets to a receiving node 1. One type of SID packet contains the total noise information and the other type of SID packet contains only an update of the noise. Generally, a total-noise SID packet is sent first during a silence period, and after that, noise-update SID packets are sent except in a situation explained in more detail below.

The RBS may re-format packets received from a mobile station as RTP packets or the mobile station may produce such packets itself, but in any event, the payload of each RTP packet holding speech or SID data, includes space for two flags: a SID flag that indicates whether the payload is holding speech or SID data, and a TAF flag that identifies the packet as either a total-noise SID packet or a noise-update SID packet. Thus, a node can detect the difference between a total-noise SID packet and a noise-update SID packet by examining the flags, or information elements, included in the packet.

The RBS forwards toward the IP network the SID packets received from the mobile station, indicating by the two flags whether the payload is SID data and, if it is, whether the SID data is an update or total noise information. Because the total-noise SID is so important and because speech data is sent as user datagram protocol (UDP) packets, the risk of losing the SID can be decreased by sending that packet more than once, either several times all together or for example when it normally occurs and when sending the next noise-update SID packet. The UDP is an IP-standard protocol that enables an application program on a first processor to send datagrams (packets) to an application program on a second processor using the IP to deliver the packets. The RBS or other receiving node 1 detects whether a payload is holding speech or SID data, and if the packet is a SID packet, the packet is saved in an area of the receiving node's memory that is different from the jitter buffer 10 as noted above. Also as noted above, usually the first SID packet in a period of silence is very important since it holds the total information of the background noise. Without this information, a vocoder in the receiving node would not be able to reconstruct the noise.

In current GSM systems, a transmitter like a mobile station needs a period of at least about twenty-four speech frames or packets to be able to prepare a SID packet holding the total noise information. Thus, if the transmitter, during a silence period, detects a short speech burst (e.g., a burst shorter than twenty-four speech packets), the transmitter will send the last noise-update SID and not the total-noise SID after the short speech burst. This is sometimes called a "hangover" case in the DTX standards, and is a case in which the receiving node should not move into a DTX mode, i.e., should not direct arriving (SID) packets to memory locations other than the jitter buffer. (See FIG. 8B.) Accordingly, there are two cases when the receiving node 1 should move into a DTX mode, i.e., should direct arriving (SID) packets to memory locations other than the jitter buffer. (See FIG. 8A.)

In the first case, the receiving node should move into DTX mode when the first arriving SID packet after a speech period holds the total noise information. In the second case, the receiving node should move into DTX mode when a noise-update SID packet arrives after a speech period and its sequence number is the next following or subsequent to the sequence number of a (earlier) speech frame. These two cases are illustrated by FIG. 8A, which depicts the jitter buffer 10 and three types of packets: DTX (SID) packets D, speech packets S, and too-late, lost or not received packets X. From FIG. 8A, it can be seen that the packet D that arrived after the sequence of seven speech packets should be a noise-update SID packet because speech packets do not occur between a total-noise SID and a noise-update SID except in the "hangover" case. Having moved into DTX mode, the SID packet arrived after the last speech packet is released to the application in due course. In a GSM system, the application will only send one particular SID packet to a receiving node like a mobile telephone once. The receiving node, when in DTX mode, moves out of DTX mode when a packet holding speech information arrives.

In cases other than the two depicted by FIG. 8A, packets should not be released to the application, i.e., when the node is receiving a noise-update SID and the last packet was lost. This results in a situation similar to the situation when speech packets are lost in an IP network and is illustrated by FIG. 8B, from which it can be seen that the packet X that arrived before the packet D might have been a total-noise SID, making the packet D a noise-update SID. If such a case, i.e., when a total-noise SID has been lost, one should not have the receiving node move into the DTX mode because the received information will be recovered poorly.

Regardless of whether the receiving node moves into DTX mode or not, the jitter buffer should not count lost packets during the time SID packets are received. In other words, it is currently believed that the methods illustrated by FIGS. 4, 5 should not be implemented while SID packets are arriving, except to the extent that the size of the jitter buffer advantageously can be changed based on previously arrived non-SID packets during DTX periods.

Assuming packets are arriving at the RBS for transmission to a mobile station, the first SID packet at the start of a silence period is usually sent to the mobile station in a traffic channel established between the RBS and mobile station. All other SID frames during that silence period are usually sent in a control channel, in particular the slow associated control channel (SACCH). If the first SID frame is a total-noise SID frame, it should only be sent once to the mobile station, but if the SID frame that was last sent was a total-noise SID frame and if a noise-update SID frame has not yet arrived and it is time to send a new SID frame to the mobile station in the SACCH, then there might be a problem. Accordingly, at this time, a noise-update SID frame holding information indicating no change in the noise should be sent in accordance with one aspect of Applicants' invention. Such a SID may be called a delta zero SID packet or frame, and the frame including a delta zero SID could be hard coded or generated on the fly (in real time) at the time when it is needed.

It will be appreciated by those of ordinary skill in the art that this invention can be embodied in other specific forms without departing from its essential character. The embodiments described above should therefore be considered in all respects to be illustrative and not restrictive. The scope of Applicants' invention is determined by the following claims, and all modifications that fall within that scope are intended to be included therein.

What is claimed is:

1. A receiving node in a packet communication system, comprising:

a jitter buffer that has a variable size, that stores packets arriving at the receiving node, and that releases stored packets to an application executing in the receiving node, wherein each packet has a respective sequence number, stored packets are released periodically, and each entry in the jitter buffer has one of at least three states; and a processor that varies the size of the jitter buffer based on an estimated variation of packet transmission delay derived from the times of arrival of stored packets.

2. The receiving node of claim 1, further comprising a variance buffer that stores variances of the times of arrival of stored packets, and wherein a time that a first arrived packet is released is based on a time of arrival of the first packet and an initial delay, and the estimated variation of packet transmission delay is derived from the stored variances.

3. The receiving node of claim 1, wherein the states of the jitter buffer entries are free, busy, and used, the free state indicates that no arrived packet is stored at that location in the jitter buffer, the busy state indicates that an arrived packet is stored at that location in the jitter buffer, and the used state indicates that an arrived packet stored at that location is being released to the application.

4. The receiving node of claim 3, wherein arrived packets are stored in respective locations that are marked in the busy state; packets are released in response to queries by the application; and when the application queries the jitter buffer for a next packet, that packet's respective location is changed to the used state and the respective location of the previously arrived packet is changed to the free state.

5. The receiving node of claim 1, wherein the processor decreases the size of the jitter buffer while the receiving node is in a discontinuous transmission mode, thereby avoiding discarding arrived packets that hold speech information.

6. The receiving node of claim 5, further comprising a DTX buffer that stores selected packets arriving at the receiving node; wherein an arriving packet is selected based on at least one of whether the arriving packet is first to arrive after a speech period and holds total noise information and whether the arriving packet contains noise-update information, arrives after a speech period, and has a respective sequence number that is subsequent to the sequence number of an earlier arriving packet holding speech information; and the processor decreases the size of the jitter buffer while packets are being selected, thereby avoiding discarding packets holding speech information.

7. A method of storing in a buffer packets arriving at a receiving node in a packet communication system and releasing arrived packets to an application executing in the receiving node, comprising the steps of:

determining a time Tr to release a first arrived packet to the application, wherein the time Tr is the first packets arrival time Ta plus an initial delay;

while waiting for the first arrived packet to be released from the buffer, comparing a current time to the time Tr and releasing the first arrived packet when the time Tr has passed; and after the first arrived packet is released, releasing stored packets periodically at first intervals;

wherein a size of the buffer varies based on an estimated variation of packet transmission delay derived from times of arrival of stored packets.

8. The method of claim 7, wherein the comparing is performed in response to queries from the application that occur periodically at second intervals, stored packets arrived after the first arrived packet are released in response to queries from the application that occur periodically at the first intervals, and the first interval is at least as long as the second interval.

9. The method of claim 7, wherein the first interval is substantially equal to transmission intervals between arriving packets.

10. A method of adapting a size of a buffer that stores packets arriving at a receiving node in a packet communication system, comprising the steps of:

counting a number of arrived packets having sequence numbers lower than that of an oldest arrived packet stored in the buffer;

comparing the number to an accepted loss parameter;

if the number is greater than the accepted loss parameter, increasing a change indicator counter and if the number is equal to or less than the accepted loss parameter, decreasing the change indicator counter:

increasing the size of the buffer when the change indicator counter reaches an indicator roof parameter if the buffer is not already at its largest permitted size; and decreasing the size of the buffer when the change indicator counter reaches an indicator floor parameter if the buffer is not already at its smallest permitted size;

wherein the size of the buffer varies based on an estimated variation of packet transmission delay derived from times of arrival of stored packets.

11. The method of claim 10, wherein the number is compared when the buffer has stored a number of packets specified by a sampling interval parameter.

12. The method of claim 10, further comprising the step of determining the size of the buffer by performing the steps of:

determining an expected arrival time of a packet in relation to an arrival time of a first packet of a packet sequence;

determining an arrival time variance for the packet;

determining a measured delay that is a time the packet will be delayed in the buffer;

determining a desired delay based on the arrival time variance and the accepted loss parameter; and determining the size of the buffer based on the desired delay and the measured delay.

13. The method of claim 12, wherein arrival time variances are stored in a variance buffer, stored arrival time variances are sorted and normalized, measured delays are accumulated for packets having arrival time variances stored in the variance buffer, the desired delay is determined based on the sorted, normalized arrival time variances and the accepted loss parameter, and the size of the buffer is determined based on the desired delay and an average measured delay derived from the accumulated measured delays.

14. The method of claim 10, wherein the size of the buffer is decreased while the receiving node is in a discontinuous transmission mode, thereby avoiding discarding arrived packets that hold speech information.

15. The method of claim 14, further comprising the step of storing in a DTX buffer selected packets arriving at the receiving node; wherein an arriving packet is selected based on at least one of whether the arriving packet is first to arrive after a speech period and holds total noise information and whether the arriving packet contains noise-update information, arrives after a speech period, and has a respective sequence number that is subsequent to the sequence number of an earlier arriving packet holding speech information; and the size of the buffer is decreased while packets are being selected, thereby avoiding discarding packets holding speech information.

* * * * *